United States Patent
Jayaraj et al.

(10) Patent No.: US 10,723,883 B2
(45) Date of Patent: Jul. 28, 2020

(54) SPIROPYRAN BASED COMPOSITION AND APPLICATION THEREOF AS SECURITY TAG

(71) Applicant: Council of Scientific and Industrial Research, New Delhi (IN)

(72) Inventors: Nithyanandhan Jayaraj, Pune (IN); Ananthan Alagumalai, Pune (IN); Pooja Ramesh Kayasth, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 15/580,882

(22) PCT Filed: Jun. 10, 2016

(86) PCT No.: PCT/IN2016/050180
§ 371 (c)(1),
(2) Date: Dec. 8, 2017

(87) PCT Pub. No.: WO2016/199173
PCT Pub. Date: Dec. 15, 2016

(65) Prior Publication Data
US 2018/0163053 A1    Jun. 14, 2018

(30) Foreign Application Priority Data
Jun. 10, 2015 (IN) .......................... 1738/DEL/2015

(51) Int. Cl.
*C09B 23/14* (2006.01)
*C08K 5/3417* (2006.01)
*C08K 5/353* (2006.01)

(52) U.S. Cl.
CPC .......... *C09B 23/145* (2013.01); *C08K 5/3417* (2013.01); *C08K 5/353* (2013.01)

(58) Field of Classification Search
None
See application file for complete search history.

(56) References Cited

U.S. PATENT DOCUMENTS

| 3,212,898 A | * | 10/1965 | Cerreta | ................ C08K 5/3415 359/241 |
| 3,799,773 A | * | 3/1974 | Watarai et al. | ........ G03C 1/685 430/120.4 |

(Continued)

FOREIGN PATENT DOCUMENTS

| CN | 103087703 | | 5/2013 | | |
| CN | 103087703 A | * | 5/2013 | ............. | C09D 11/50 |

(Continued)

OTHER PUBLICATIONS

Tork—Photochromic behavior of spiropyran in polymer matrices—Applied Optics—2001 (Year: 2001).*

(Continued)

*Primary Examiner* — Callie E Shosho
*Assistant Examiner* — John Vincent Lawler
(74) *Attorney, Agent, or Firm* — Carmody Torrance Sandak & Hennessey LLP

(57) ABSTRACT

The present invention discloses the spiropyran compound of formula (I), process for preparation thereof and a composition comprising spiropyran compound of formula (I) on a support, wherein said support selected from polymers such as Poly (ethylene oxide), Polydimethylsiloxane (PDMS), Ethylene propylene diene monomer (EPDM).

2 Claims, 5 Drawing Sheets

(56) References Cited

U.S. PATENT DOCUMENTS

| | | | | |
|---|---|---|---|---|
| 4,927,180 A | * | 5/1990 | Trundle | B41M 3/142 283/70 |
| 5,759,729 A | * | 6/1998 | Martin | G03G 9/0906 430/108.1 |
| 5,914,197 A | * | 6/1999 | Goudjil | A44C 5/0023 250/372 |
| 7,342,112 B2 | * | 3/2008 | Kumar | C07D 311/94 544/71 |
| 2005/0019711 A1 | * | 1/2005 | Takizawa | B82Y 10/00 430/561 |
| 2010/0230648 A1 | * | 9/2010 | Izumi | C07D 311/78 252/586 |

FOREIGN PATENT DOCUMENTS

| | | | | |
|---|---|---|---|---|
| EP | 0328320 | | 8/1989 | |
| EP | 0328320 A1 | * | 8/1989 | D06H 1/00 |
| FR | 1588282 | * | 4/1970 | |

OTHER PUBLICATIONS

MT of Zhang—CN 103087703 A (Year: 2013).*
Fruit—FR 1,588,282 A—MT—PP_spiropyran fiber—modifications—1970 (Year: 1970).*
Nam—Photochromic spiropyran PDMS—ChemCommun 50 (2014) 4251 (Year: 2014).*

* cited by examiner

SPIROPYRAN BASED COMPOSITION AND APPLICATION THEREOF AS SECURITY TAG

FIELD OF THE INVENTION

The present invention relates to a spiropyran compound of formula (I). More particularly, the present invention relates to a spiropyran compound of formula (I), process for preparation thereof and a composition comprising spiropyran compound of formula (I) on a support, wherein said support selected from polymers such as Poly (ethylene oxide), Polydimethylsiloxane (PDMS), Ethylene propylene diene monomer (EPDM) for use in security tag.

BACKGROUND AND PRIOR ART

Reversible organic reaction reactions that were initiated by external stimuli contributed enormously to the field of sensor chemistry as both the reactant and product can be distinguished by specific optical, electrical properties. Being utilized in specific applications, the reaction initiation should require non-invasive and very cheap inputs. Though variety of chemical inputs such as heat, pH, light, electrical have been utilized, optical input has been a superior choice because of its spatial and temporal control. Azobenzene, diarylethylene and spiropyran chromophores have been utilized molecular switches triggered by light. Spiropyran is one of the photochromic compounds, it changed to blue color upon exciting with UV light and the reaction is reversible under visible or thermal conditions. The color produced by the formation of merocyanine. Spiropyran derivatives are most well-known as typical organic compounds which reversibly colors or decolorizes upon exposure to the energy of light or heat.

However, attempts to introduce conventional spiropyran derivatives into use encounters the problems like the colored form (or the colorless form) present in a solution or high polymer binder is low in stability to light or heat, the system immediately returns to colorless (colored). Also, when they repeatedly exposed to light and heat for coloration and decolorization (recording and erasure), the exposure to light gives rise to a side reaction, which decomposes or deteriorates the spiropyran derivative. Thus, the derivative is not fully resistant to repetitions. Although, the spiropyran derivative for use as a photochromic medium is usually dispersed in a high polymer substance, the derivative dissolves out from the high polymer substance, or separates out therefrom through phase separation since the derivative generally has low compatibility with the high polymer substance.

U.S. Pat. No. 5,252,742 disclosed a spiropyran compound represented by the formula (I)

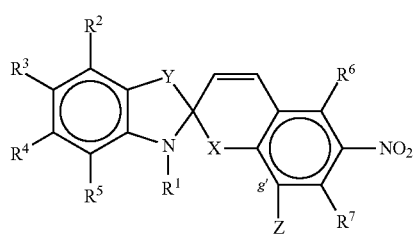

(I)

wherein $R_1$ is alkyl having 1 to 20 carbon atoms or aralkyl, R2, R3, R4 and R5 are the same or different and are each a hydrogen atom, alkyl having 1 to 6 carbon atoms, aryl or aralkyl, alkoxyl having 1 to 5 carbon atoms, halogen atom, cyano, trichloromethyl, trifluoromethyl or nitro, $R_6$ and $R_7$ are the same or different and are each a hydrogen atom, alkyl having 1 to 6 carbon atoms, aryl or aralkyl, halogen atom, cyano or nitro, X is an oxygen atom or sulfur atom, Y is Se or $(CH_3)_2C<$, Z is and X is a sulfur atom when Y is $(CH_3)2C<$. The spiropyran compound of the present invention itself is usable as a material such as recording material, photosensitive material, optical filter or decorative material. The present compound can further be homopolymerized or copolymerized with other polymerizable compound into a high polymer spiropyran compound for application to optical devices or dynamic devices Article titled "Spiropyrans as molecular optical switches" by B Seefeldt et al. published in *Photochem. Photobiol. Sci.*, 2010, 9, pp 213-220 reports a water soluble switchable spiropyran derivative and demonstrates the first intermolecular single-molecule photoswitching experiments in polymers.

Chinese patent no. 101704921 disclosed a technique for preparing an ultraviolet discoloration acrylate polymers, in particular to the reaction of the spiropyran-based polymer having active spiropyran compound reactive with the acrylic polymer, wherein said spiropyran having the structural formula

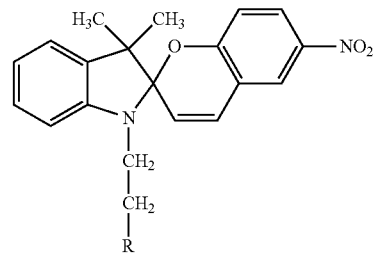

Wherein the reactive group R may be a hydroxyl group or a carboxyl group.

The photochromic behavior of spiropyran in polymer matrices has been studied by several workers. It is known that the colour reversibility between the two forms is satisfactory only for a limited number of repetitive coloring and decoloring changes. Furthermore, the insertion of spiropyrans into polymer films decreases their photocoloration rate in comparison to that in liquid solutions.

Article titled "Photochromic Behavior of Spiropyran and Fulgide in Thin Films of Blends of PMMA and SBS" by J S Lin et al. published in *Journal of Polymer Research*, 2003, 10 (2), pp 105-110 reports two types of photochromic colorants of either spiropyran or fulgide were dispersed in thin films of blends of polymethyl methacrylate (PMMA) and styrene-butadiene-styrene copolymer (SBS) with various ratios. The thin films were illuminated with ultraviolet light (365 nm) under various temperatures. The results show that the color form of spiropyran is more stable in polar PMMA and caused a blue shift in the absorption spectrum of merocyanine.

Article titled "Photochromic behavior of spiropyran in polystyrene and polycaprolactone thin films—Effect of UV absorber and antioxidant compound" by A Samoladas et al. published in Dyes and Pigments, 2008, 76 (2), pp 386-393 reports the photochromic spiropyran 1',3'-dihydro-8- methoxy-1',3',3'-trimethyl-6-nitrospiro[2H-1-benzopyran-2, 2'-(2H)-indole] dispersed into polystyrene (PS) and polycaprolactone (PCL) matrices in the form of thin films. These photochromic films were illuminated with ultraviolet irradiation (365 nm) at room temperature and for different time periods in the absence and in the presence of a UV absorber and an antioxidant compound, at specific proportions. The polarity of the polymer matrix can induce the maximum absorbance of the photochromic compound. In pure polymers the most intense peaks occur at 608 nm in PS and at 589 nm in PCL.

Article titled "Photochromic behavior of spiropyran in polymer matrices" by Amir Tork et al. published in applied optics, 2001, 40 (8), pp 1180-1186 reports the photoexcitation, relaxation, and optical erasure regimes of spiropyran- (SP-) doped polymer films. Cellulose acetate, poly(vinyl acetate), and poly(methyl methacrylate) (PMMA) were used as host polymer matrices.

Article titled "Photo-responsive polymeric structures based on spiropyran" by L Florea et al. published in *Macromolecular Materials and Engineering*, 2012, 297 (12), pp 1148-1159 reports the review on incorporating polymeric materials into spiropyran units and focuses on the effectiveness of their reversible response to external photonic stimuli.

Article titled "Synthesis and Properties of Benzophenone-Spiropyran and Naphthalene-Spiropyran Conjugates" by M Tomasulo et al. published in *J. Org. Chem.*, 2007, 72 (2), pp 595-605 reports four compounds integrating luminescent and photochromic components in their molecular skeletons. Two of them combine a nitrospiropyran photochrome with either one or two naphthalene fluorophores and can be prepared in three synthetic steps. The other two consist of a nitrospiropyran photochrome and a benzophenone phosphore connected by either ether or ester linkages and can be prepared in six or five, respectively, synthetic steps. The luminescent components of these assemblies are expected to transfer energy intramolecularly to the photochromic species upon excitation and encourage their photoisomerization.

Article titled "Photodynamic transport of metal ions" by J D Winkler et al. published in *J. Am. Chem. Soc.*, 1989, 111 (2), pp 769-770 reports photodynamic ion transport using spiropyranindoline 3a and the chloride salts of zinc(II), copper(II), and cadmium(II). Changes in transport rate of an order of magnitude were observed.

Article titled "Synthesis and studies of photochromic properties of spirobenzopyran carboxy derivatives and their model compounds as potential markers" by A. V. Laptev et al. published in *Russian Chemical Bulletin*, 2014, 63 (9), pp 2026-2035 reports a number of photochromic markers, viz., spirobenzopyrans containing one or two active carboxy groups attached directly or through a spacer, as well as their model derivatives. The obtained compounds were characterized by instrumental methods of analysis. Spectrokinetic methods were used to study the behavior of the spirobenzopyran markers and the model derivatives in solutions in EtOH and toluene.

The main problem of spiropyrans is their low stability and for this reason several attempts have been performed in order to graft them in the backbone of a macromolecular chain or to incorporate them into a polymer matrix.

OBJECTIVE OF INVENTION

The main objective of the present invention is to provide a composition comprising a spiropyran based compound of formula (I) on a support, wherein said support selected from polymers such as Poly (ethylene oxide), Polypropylene (PP), Polydimethylsiloxane (PDMS), Ethylene propylene diene monomer (EPDM).

SUMMARY OF THE INVENTION

Accordingly, the present invention provides a composition comprising a spiropyran compound of formula (I) on a support, wherein said support selected from polymers such as Poly (ethylene oxide), polypropylene (PP), Polydimethylsiloxane (PDMS), Ethylene propylene diene monomer (EPDM).

In preferred embodiment, said spiropyran compound of formula (I) is selected from 1,3,3-trimethyl-6-nitrospiro(chromene-2,2'-indolinine (1), 1-decyl-3',3'-trimethyl-6-nitrospiro[chromene-2,2'-indoline] (2), 2-(3,3-dimethyl-6-nitrospiro(chromene-2-2'-indolin)-1'-yl)ethanol (3) or 1',3',3'-trimethyl-6-nitrospiro[chromene-2,2'-indoline]-5'-carboxylic acid (4).

In another preferred embodiment, said composition comprises spiropyran compound of formula (I) embedded in polyethylene oxide.

In yet another preferred embodiment, said spiropyran compound of formula (I) is selected from 1,3,3-trimethyl-6-nitrospiro(chromene-2,2'-indolinine (1), 1-decyl-3',3'-trimethyl-6-nitrospiro[chromene-2,2'-indoline] (2), 2-(3,3-dimethyl-6-nitrospiro(chromene-2-2'-indolin)-1'-yl)ethanol (3) or 1',3',3'-trimethyl-6-nitrospiro[chromene-2,2'-indoline]-5'-carboxylic acid (4).

In still another preferred embodiment, said composition comprises 1-decyl-3',3'-trimethyl-6-nitrospiro[chromene-2,2'-indoline] (2) embedded in polypropylene.

In yet still another preferred embodiment, said composition comprises 1,3,3-trimethyl-6-nitrospiro(chromene-2,2'-indolinine (1), 1-decyl-3',3'-trimethyl-6-nitrospiro[chromene-2,2'-indoline] (2) spiropyran embedded in polydimethylsiloxane.

In yet still another preferred embodiment, the ratio of a spiropyran compound of formula (I) and a support is in the range of 2% of spiropyran:98% of support to 20% of spiropyran:80% of support.

In yet still another preferred embodiment, said composition can be used as a security tag.

DETAILED DESCRIPTION OF THE INVENTION

Figure 1:
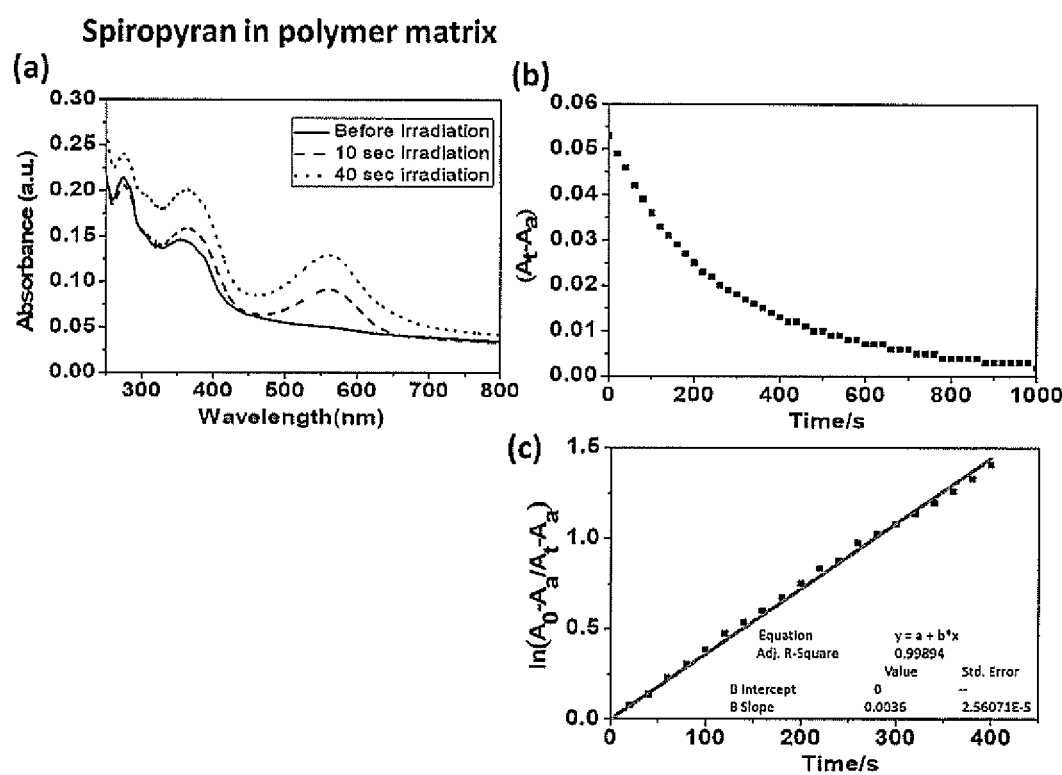
FIG. 1: Depicts kinetic study of conversion of merocyanine to spiropyran (a) Absorption spectrum of spiropyaran in PEO thin film. (b) Decay constant of MC to SP (c) First-order plot of photo decoration of MC to SP.

The invention will now be described in detail in connection with certain preferred and optional embodiments, so that various aspects thereof may be more fully understood and appreciated.

In the view of above, the present invention provides a spiropyran compound of formula (I), process for preparation thereof and a composition comprising spiropyran compound of formula (I) on a support, wherein said support selected from polymers such as Poly (ethylene oxide), polypropylene (PP), polydimethylsiloxane (PDMS), ethylene propylene diene monomer (EPDM).

In an embodiment, the present invention provides a spiropyran compound of formula (I);

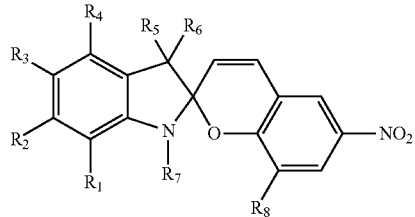

Formula (I)

Wherein, $R_1$-$R_6$ is selected independently from alkyl, alkoxy, substituted alkene, substituted alkenoxy, aldehyde, halides, substituted alcohol or substituted acid, aryl;

$R_7$ is selected independently from alkyl, substituted alkene, aldehyde, alkyl halides, substituted alcohol, substituted acid or substituted alkenoxy.

In preferred embodiment, said spiropyran compound is selected from 1,3,3-trimethyl-6-nitrospiro(chromene-2,2'-indolinine (SP-1, 1), 1-decyl-3',3'-trimethyl-6-nitrospiro[chromene-2,2'-indoline] (SP-10, 2), 2-(3,3-dimethyl-6-nitrospiro(chromene-2-2'-indolin)-1'-yl)ethanol (SP-CH$_2$CH$_2$OH, 3) or 1',3',3'-trimethyl-6-nitrospiro[chromene-2,2'-indoline]-5'-carboxylic acid (SP-CO$_2$H, 4).

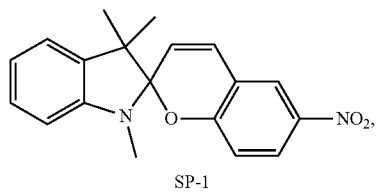

SP-1

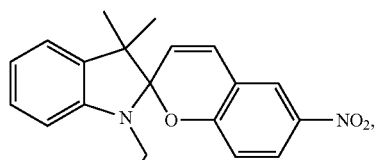

SP-10

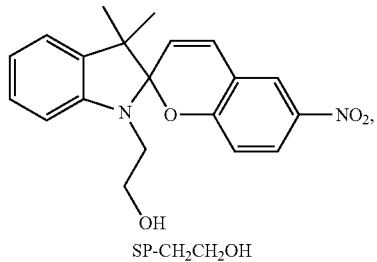

SP-CH$_2$CH$_2$OH

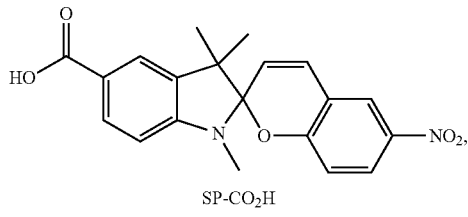

SP-CO$_2$H

In another, embodiment, the present invention provides a process for the preparation of compound of formula (I), wherein said process comprising the steps of:
(a) N-alkylating the substituted 2,3,3-tetramethyl-3H-indoledene with halogenated compound at temperature in the range of 90 to 120° C. for the period in the range of 16 to 24 hr to afford 2,3,3-tetramethyl-3H-indol-1-ium halide;
(b) Stirred the reaction mixture of step (a) in base and solvent at temperature in the range of 25 to 30° C. for the period in the range of 15 to 30 min to afford indolinine compound;
(c) Condensing compound of step (b) with nitro salicylaldehyde at temperature in the range of 80 to 90° C. for the period in the range of 6 to 8 hr to afford the corresponding spiropyran compound of formula (I).

In preferred embodiment, said halogenated compound is selected from methyl iodide, 2-bromo ethanol, 1-bromodecane or 3-methyl-2-butanone.

In another preferred embodiment, said solvent is diethyl ether.

In yet another preferred embodiment, said base is sodium hydroxide (NaOH).

In yet another embodiment, the present invention provides a composition comprising a spiropyran compound of formula (I) on a support, wherein said support selected from polymers such as Poly (ethylene oxide), polypropylene (PP), Polydimethylsiloxane (PDMS), Ethylene propylene diene monomer (EPDM).

In preferred embodiment, said spiropyran compound of formula (I) is selected from 1,3,3-trimethyl-6-nitrospiro (chromene-2,2'-indolinine (1), 1-decyl-3',3'-trimethyl-6-nitrospiro[chromene-2,2'-indoline] (2), 2-(3,3-dimethyl-6-nitrospiro(chromene-2-2'-indolin)-1'-yl)ethanol (3) or 1',3',3'-trimethyl-6-nitrospiro[chromene-2,2'-indoline]-5'-carboxylic acid (4).

In another preferred embodiment, said composition comprises spiropyran compound of formula (I) embedded in polyethylene oxide.

In yet another preferred embodiment, said spiropyran compound of formula (I) is selected from 1,3,3-trimethyl-6-nitrospiro(chromene-2,2'-indolinine (1), 1-decyl-3',3'-trimethyl-6-nitrospiro[chromene-2,2'-indoline] (2), 2-(3,3- dimethyl-6-nitrospiro(chromene-2-2'-indolin)-1'-yl)ethanol (3) or 1',3',3'-trimethyl-6-nitrospiro[chromene-2,2'-indoline]-5'-carboxylic acid (4).

In still another preferred embodiment, said composition comprises 1-decyl-3',3'-trimethyl-6-nitrospiro[chromene-2,2'-indoline] (2) embedded in polypropylene.

In yet still another preferred embodiment, said composition comprises 1,3,3-trimethyl-6-nitrospiro(chromene-2,2'-indolinine (1), 1-decyl-3',3'-trimethyl-6-nitrospiro[chromene-2,2'-indoline] (2) spiropyran embedded in polydimethylsiloxane.

In yet another preferred embodiment, the ratio of a spiropyran compound of formula (I) and a support is in the range of 2% of spiropyran:98% of support to 20% of spiropyran:80% of support.

In yet still another preferred embodiment, said composition can be used as a security tag.

The process for the preparation of spiropyran compound of formula (I) is as depicted in scheme A;

Scheme A. Synthetic route for the spiropyran derivatives.

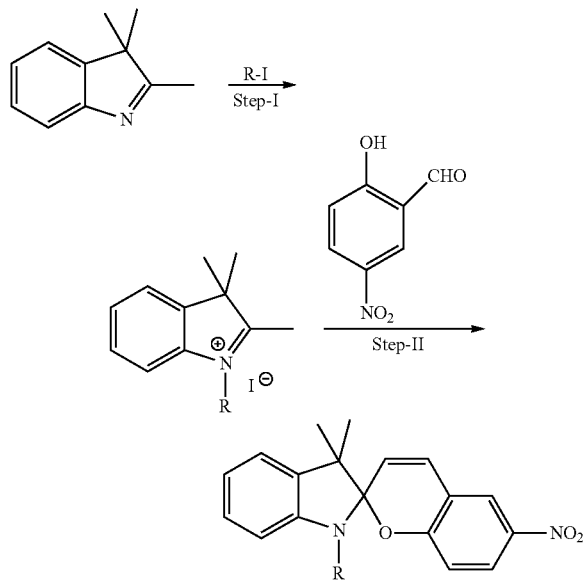

From FIG. 1 it is observed that the SP-1 (1) embedded PEO film not showed any appreciable absorbance at 560 nm (FIG. 1a, thick line), however upon exposing the film to 365 nm light (1 W LED source) for 10 s, formation of blue colored merocyanine was monitored by the appearance of a broad peak centered at 560 nm, and FIGS. 1b and 1c showed the first order kinetic plot to derive the rate constants and half-life of merocyanine intermediate.

Figure 2:
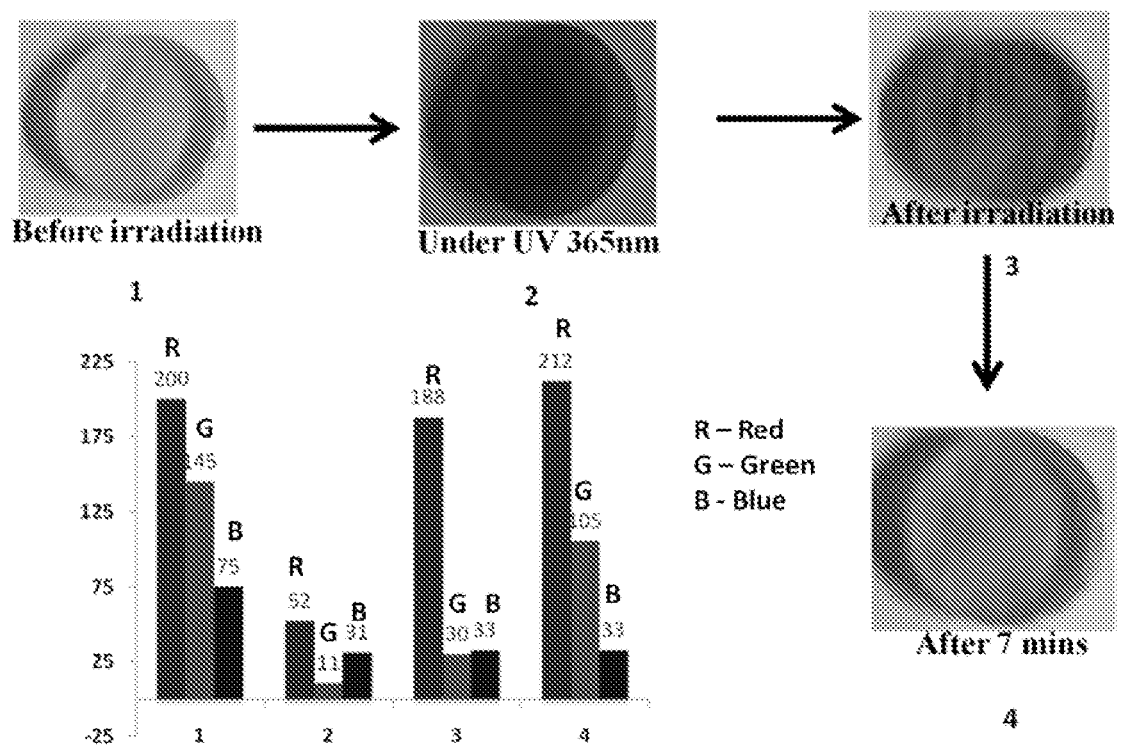
FIG. 2: Depicts change in red, green, and blue component upon irradiation (with SP1).

The utilized SP-1(1) embedded PDMS film, a colorless transparent film (FIGS. 2, 1) changes its color to purple color (FIGS. 2, 3), and it is red fluorescent under UV light (365 nm) (FIG. 2. 2) and the colored merocyanine turned to colorless SP-1 within 7 minutes. The bar diagram showed the change in RGB component (R—Red, G—Green, B—Blue) at each stages, FIG. 1-4. The change in green component is very significant (145 (1)-30 (3)-105 (4) which can be used as a security marker.

Figure 3:
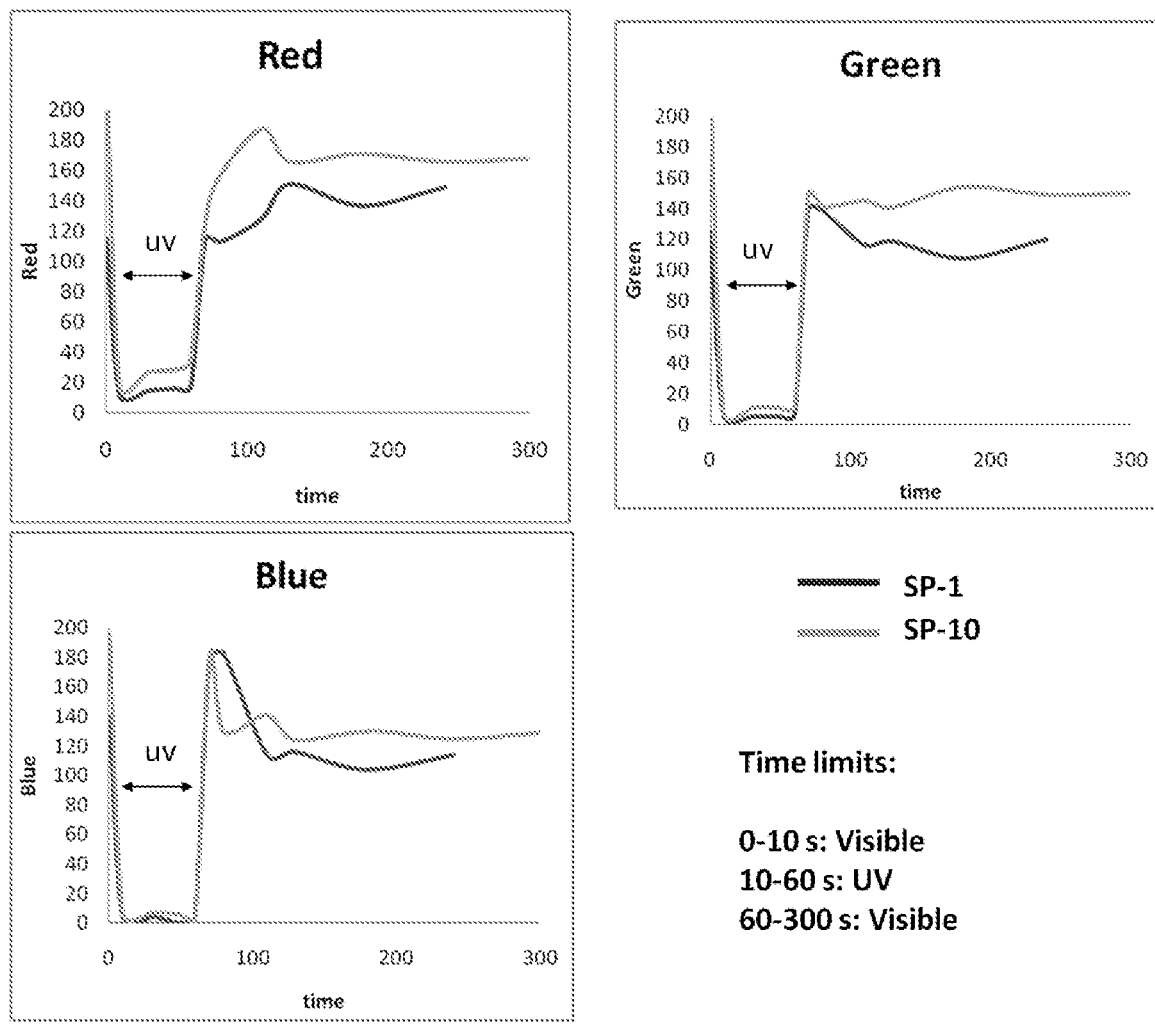
FIG. 3: Depicts time course evolution of red, blue and green components for SP-1 and SP-10 dyes in PDMS film.
Figure 4:
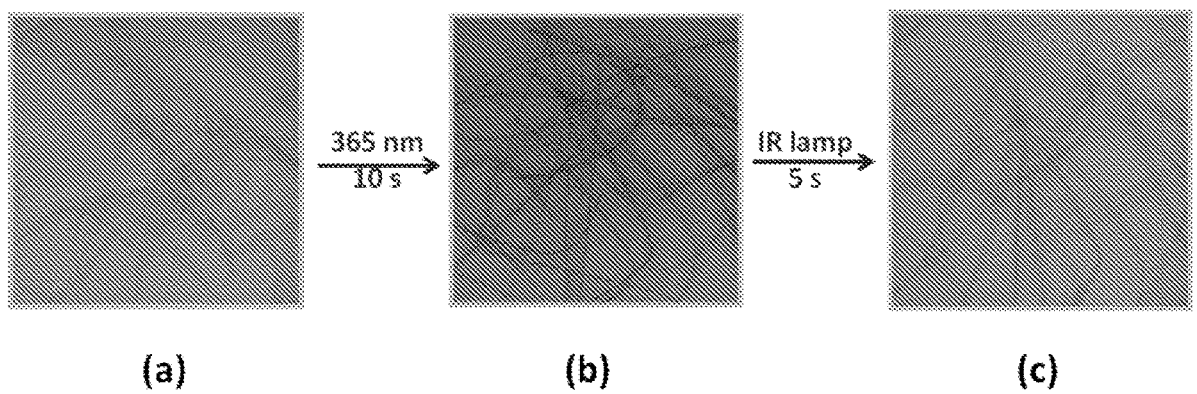
FIG. 4: Spiropyran embedded polypropylene fibre (a), and color changes to blue upon exposure to UV light (365 nm) and reversal to the spiropyran (c, upon exposure to IR light).

The SP-1 (1) and SP-10 (2) are embedded on PDMS and spread over in a A4 sheet so that thin film of SP1@PDMS and SP10@PDMS is formed and cured at 80° C. A time course study of change in RGB component is monitored (FIG. 3).

Figure 5:
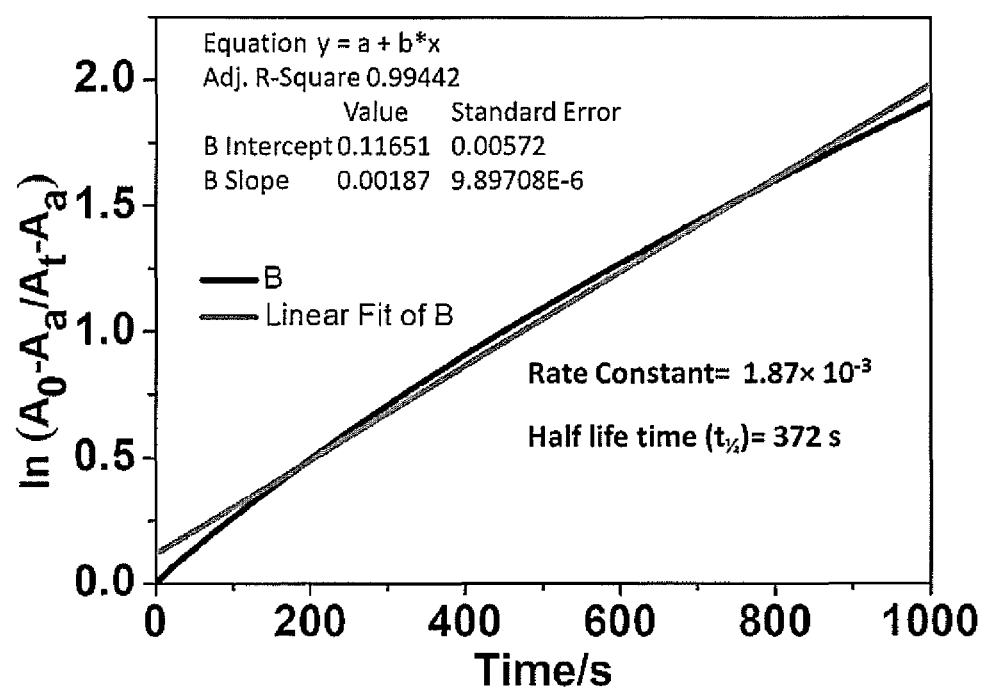
FIG. 5: First order kinetic plots to derive the rate constant of the ring closing reaction and half-life period.

The SP-10 is melt compounded to polypropylene and fibres of 25 micron diameter is extruded, and change of color change from colorless (FIG. 4a) to purple color (FIG. 4b) is monitored upon exposure to 365 nm for 10 s. The color disappearance is realized by exposing the fibres to IR lamp for 5 s (FIG. 4c). Also the kinetics at room temperature is monitored to arrive a half life of 372 s (FIG. 5).

In one embodiment, the present invention provides a composition of SP-10 in to polypropylene fiber. The spiropyran derivatives is melt compounded into polypropylene, a thermoplastic fibre forming polymer, using a DSM twin screw micro compounder and successfully extruded into fibres of 25-30 micron diameter. The spiropyran derivatives are found to be thermally stable under polymer melt-processing conditions and retained their photochromic function. Interestingly, the time of exposure for inducing color change is considerably reduced when the geometry is changed from films to fibres, owing to higher specific surface area of fibres. Upon exposing the pressed polypropylene film containing SP-10, showed the immediate color change to blue, and the kinetics on the reverse reaction is studied. The kinetic study showed the half life period of 372 s (FIG. 5) for the merocynine form.

The systematic studies showed that the half life of merocyanine that is formed by photo-irradiation of SP derivative could be modulated by proper choice of polymer and the functional groups at the SP. SP embedded polypropylene fiber is formed and studied the photochromic activity of the fiber.

The following examples, which include preferred embodiments, will serve to illustrate the practice of this invention, it being understood that the particulars shown are by way of example and for purpose of illustrative discussion of preferred embodiments of the invention.

EXAMPLES

Example 1: Synthesis of 1,3,3-trimethyl-6-nitrospiro(chromene-2,2'-indolinine (1)

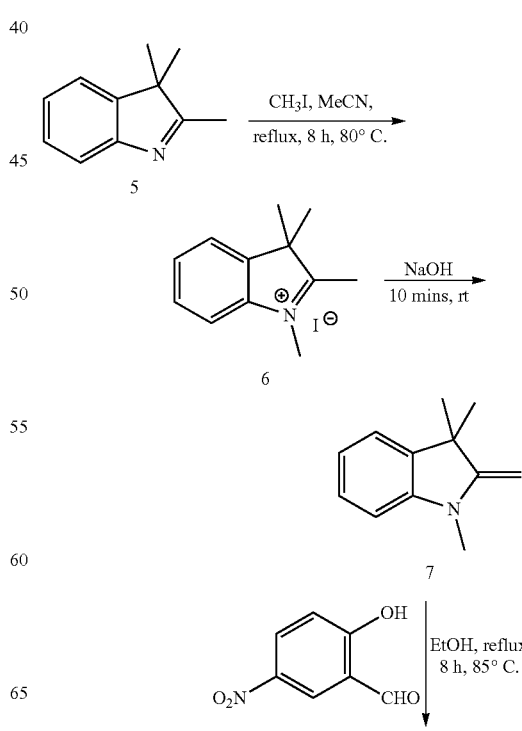

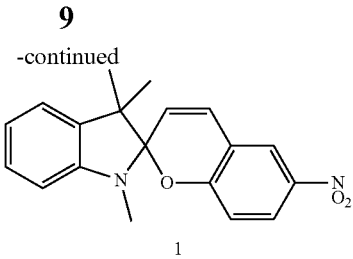

1 a) Synthesis of 1,2,3,3-tetramethyl-3H-indol-1-ium iodide (6)

2,3,3-trimethyl indolinine (3 g, 18.8 mmol), methyl iodide (5.35 g, 37.7 mmol) and 80 mL of acetonitrile were heated 110° C. for 8 h. After this period the remaining solution was cooled. It was concentrated with reduced pressure and then it was washed with diethyl ether (3×30 mL). The yield of compound was show shining pink color solid. It was characterized by $^1$H-NMR by using CDCl$_3$ solvent it was given below (δ, ppm., J(Hz)): J=1.67 (6H, s, (CH$_3$)2); J=4.31 (3H, s, (CH$_3$); J=3.11 (3H, s, N—CH$_3$); J=7.57-7.67 (4H, m).

b) Synthesis of 1,3,3-trimethyl-2-methyleneindolinine (7)

1,2,3,3-tetramethyl-3H-indol-1-ium iodide (2 g, 6.63 mmol) was dissolved in a stirred 40% of NaOH (60 mL) and diethyl ether (150 mL) was added into the reaction mixture vigorous and stirred at 25-30° C. for 15-30 mis. After this period of time diethyl ether was separated and dried with anhydrous sodium sulphate. It was filtrated and evaporated under reduced pressure. The yield of compound was yellow oil in nature. It was characterized by $^1$H-NMR by using CDCl$_3$ solvent it was given below (δ, ppm., J(Hz)): J=1.27 (6H, s, (CH$_3$)2); J=4.31 (3H, s, (CH$_3$); J=2.96 (3H, s, N—CH$_3$); J=6.44 (1H d, CH); J=6.68 (1H, t, CH); J=6.72-7.18 (2H, m, CH).

c) Synthesis of 1,3,3-trimethyl-6-nitrospiro(chromene-2,2'-indolinine (1)

1,3,3-trimethyl-2-methyleneindolinine (1 g, 57.7 mmol) and 5-nitrosalicylaldehyde were (1.45 g, 86.5 mmol) in ethanol, and then heated to 80° C. under reflux for 8 h. After this period the solution under reduced pressure. It was purified with ethyl acetate (10%) and pet ether (90%). The nature of compound was green solid. It was characterized by $^1$H-NMR by using CDCl$_3$ solvent it was given below (δ, ppm., J(Hz)): J=1.20 (3H, s, (CH$_3$); J=1.31 (3H, s, (CH$_3$); J=2.76 (3H, s, N—CH$_3$); J=5.95 (1H d, CH); J=6.60 (1H, t, CH); J=6.81 (1H, d, —CH—); J=6.91 (1H, d, —CH—); J=7.09 (1H, d, —CH—); J=7.09 (1H, d, —CH—); J=7.22 (1H, d, (—CH)$_2$).

Example 2: Synthesis of 1-decyl-3',3'-trimethyl-6-nitrospiro[chromene-2,2'-indoline] (2)

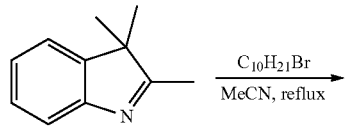

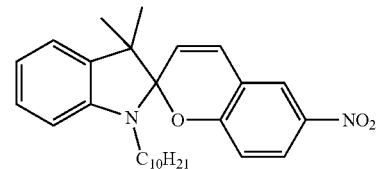

a) Synthesis of 1-decyl-2,3,3-trimethyl-3H-indol-1-ium bromide (10)

2,3,3-trimethyl indolinine (2 g, 12.561 mmol), 1-bromodecane (3.3 g, 15.0723 mmol) and acetonitrile were heated at 110° C. reflux for 24 h. After the reaction cooled to room temperature and the solution was concentrated under reduced pressure, oil nature of solidified was formed. It was washed with hexane 3 times, filtrated the compound was dark pink color. It was characterized by $^1$H-NMR by using CDCl$_3$ solvent, it was given below (δ, ppm., J(Hz)): J=0.85 (3H, t, (CH$_3$); J=1.27, (12H, s, ((CH$_2$)$_6$); J=1.36 (6H, s, ((CH$_3$)$_2$); J=1.39 (2H, t, —CH$_2$); J=1.86 (2H, m, —CH$_2$); J=1.39 (3H, s, —CH$_3$); J=7.5 (1H d, CH); J=7.31-7.36 (2H, m, —CH—CH—); J=7.58 (2H, m, —CH—CH—).

b) Synthesis of 1-decyl-3',3'-trimethyl-6-nitrospiro[chromene-2,2'-indoline] (2)

1-decyl-2,3,3-trimethyl-3H-indol-1-ium bromide (500 mg, 1.32 mmol), 5-nirosalicylaldehyde (335 mg, 1.5823 mmol), Piperidine (123.36 mg, 1.45 mmol) in ethanol 20 mL was heated to 80° C. reflux under nitrogen gas at 3-4 h. Then it was concentrated with reduced pressure, it was purified by 15% of ethyl acetate and 85% of toluene. The nature compound color is pink solid. It was characterized by $^1$H-NMR by using DMSO solvent it was given below (δ, ppm., J(Hz)): J=0.90 (3H, t, (CH$_3$) J=1.23-1.56 (22H, m, (CH$_3$)$_2$ —(CH$_2$)$_8$; J=1.86 (2H, m, —CH$_2$); J=3.18 (1H, t, —CH$_2$); J=5.83 (1H d, CH); J=6.86 (1H d, CH); J=6.87-7.19 (5H, m, (—CH)$_5$); J=8.03 (2H, m, —CH—CH—)

Example 3: Synthesis of 2-(3,3-dimethyl-6-nitro-spiro(chromene-2-2'-indolin)-1'-yl)ethanol (3)

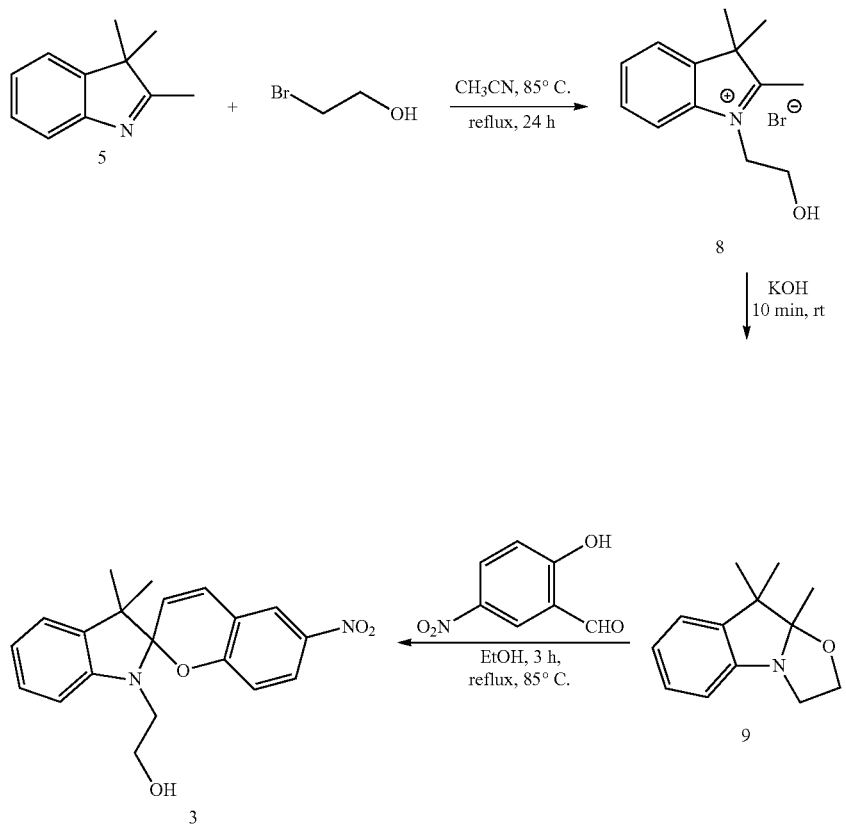

a) Synthesis of 1-(2-hydroxyethyl)-2,3,3-trimethyl-3H-indol-1-ium bromide (8)

2,3,3-trimethyl indolinine (2 g, 12.561 mmol), 2-bromo ethanol (2.35 mmol) were heated reflux for 24 h. After the reaction cooled to room temperature and the solution was concentrated under reduced pressure, oil nature of solidified was formed. It was washed with hexane 3 times, filtrated the compound was dark pink color. It was characterized by $^1$H-NMR by using $CDCl_3$ solvent it was given below (δ, ppm., J(Hz)): J=1.65 (6H, s, $(CH_3)2$); J=3.14, (3H, s, $(CH_3)$; J=4.2 (2H, t, N—$CH_2$); J=4.89 (2H, t, $CH_2$); J=7.5 (1H d, CH); J=6.72-7.18 (3H, m, —CH—CH—CH—)

b) Synthesis of 9,9,9a-trimethyl-2,3,9,9a-tetrahydrooxazolo(3,2-a)indole (9)

1-(2-hydroxyethyl)-2,3,3-trimethyl-3H-indol-1-ium bromide (500 mg, 3.51 mmol) was dissolved in 20% of KOH (0.6 g, 10.69 mmol) in water (50 mL) and stirred at 25° C. for 15 mins. Then it was extracted with diethyl ether. The organic layer was concentrated under reduced pressure. The compound nature was yellow in oil. It was characterized by $^1$H-NMR by using $CDCl_3$ solvent it was given below (δ, ppm., J(Hz)): J=1.26 (3H, s, $(CH_3)$); J=3.29, (3H, s, $(CH_3)$); J=3.29, (3H, s, $(CH_3)$); J=3.52-3.85 (4H, m, —$CH_2$—$CH_2$—); J=4.89 (2H, t, $CH_2$); J=6.77 (1H d, CH); J=6.92 (1H, t, CH); J=7.05-7.14 (2H, m, —$(CH)_2$)

c) Synthesis of 2-(3,3-dimethyl-6-nitrospiro (chromene-2-2'-indolin)-1'-yl)ethanol (3)

9,9,9a-trimethyl-2,3,9,9a-tetrahydrooxazolo(3,2-a)indole (500 mg, 2.462 mmol) and 5-nirosalicylaldehyde (783 mg, 3.7 mmol) in ethanol 20 mL was heated reflux under nitrogen gas at 3 h. Then it was concentrated with reduced pressure, it was purified by 90% of ethyl acetate and 10% of Methanol. The nature compound color is purple solid. It was characterized by $^1$H-NMR by using $CDCl_3$ solvent it was given below (δ, ppm., J(Hz)): J=1.20 (3H, s, $(CH_3)$); J=1.26 (3H, s, $(CH_3)$); J=3.40 (2H, t, N—$CH_2$); J=3.8 (2H, t, $CH_2$); J=5.92 (1H d, CH); J=6.92 (1H, t, CH); J=6.70 (2H, q, —CH—CH—); J=6.95 (2H, t, —CH—CH—); J=7.20 (2H, q, —CH—CH—); J=8.06 (2H, d, (—$CH)_2$)

Example 4: Synthesis of 1',3',3'-trimethyl-6-nitro-spiro[chromene-2,2'-indoline]-5'-carboxylic acid (4)

a) Synthesis of 2,3,3-trimethyl-3H-indole-5-carboxylic acid (12)

4-hydrazinobenzoic acid (4 g, 21.21 mmol), 3-methyl-2-butanone (3.65 g 42.41 mmol) were dissolved in acetic acid 50 mL. Then it was heated refluxed for 16 h. After that reaction mixture was cooled to room temperature, acetic acid was removed by rotvapor. Then unsaturated solution of potassium carbonate was added, pH=4 level is maintained for adding of HCL and it was extracted with DCM, dried (Na$_2$SO$_4$) and concentrated under reduced pressure. The nature compound of the compound is brown solid. It was characterized by $^1$H-NMR by using DMSO solvent it was given below (δ, ppm., J(Hz)): J=1.38 (6H, s, ((CH$_3$)$_2$); J=2.39 (3H, s, —CH$_3$); J=7.7 (1H, d, —CH—); J=8.17-8.13 (2H, d, —(CH)$_2$)

b) Synthesis of 5-carboxy-1,2,3,3-tetramethyl-3H-indol-1-ium iodide (13)

2,3,3-trimethyl-3H-indole-5-carboxylic acid (1.5 g, 7.3808), methyl iodide (2.1 g, 14.76 mmol) in acetonitrile 60 mL refluxed for 14 h. After that reaction mixture was cooled to room temperature, acetonitrile was removed by rotvapor. It was washed with diethyl ether and filtrated, the compound was brown solid. It was characterized by $^1$H-NMR by using DMSO solvent it was given below (δ, ppm., J(Hz)): J=1.56 (6H, s, ((CH$_3$)$_2$); J=3.99 (3H, s, —CH$_3$); J=2.81 (3H, s, N—CH$_3$); J=8.03 (1H, d, —CH—); J=8.20 (1H, d, —CH—); J=8.38 (1H, t, —CH—)

c) Synthesis of 1',3',3'-trimethyl-6-nitrospiro [chromene-2,2'-indoline]-5'-carboxylic acid (4)

5-carboxy-1,2,3,3-tetramethyl-3H-indol-1-ium iodide (200 mg, 0.5794 mmol), 5-nirosalicylaldehyde (210 mg, 0.9850 mmol), Piperidine (123.36 mg, 1.44875 mmol) in ethanol 20 mL was heated reflux under nitrogen gas at 6 h. Then it was concentrated with reduced pressure, it was purified by 10% of ethyl acetate and 90% of toluene. The nature compound color is yellow solid. Then characterized by $^1$H-NMR, it was some impurities there. So once again it was purified with 20% of ethyl acetate and 80% of pet ether. It was characterized by $^1$H-NMR by using DMSO solvent it was given below (δ, ppm., J(Hz)): J=1.19 (3H, s, (CH$_3$); J=1.27 (3H, s, (CH$_3$); J=2.79 (3H, s, N—CH$_3$); J=6.07 (1H d, CH); J=6.75 (1H d, CH); J=7.31 (1H d, CH); J=7.70 (1H d, CH); J=7.82 (1H d, CH); J=8.07 (1H d, CH); J=8.28 (1H d, CH)

Example 5: Kinetic Experiment for Spiropyran Thin Film

Spiropyran in Polyethylene Oxide Thin Film 2 mg of spiropyran was dissolved in 4 mL of 0.2% PEO (in chloroform). Thin film was formed by adding 0.5 mL of polymer solution to a clean quartz plate which was kept on the spin coater. Then washed quartz plate was kept in spin coater instrument, the film was dried at room temperature for 15 mins. The kinetics of merocyanine to spiropyran was monitored by UV-Vis spectroscopy (color to colorless) by observing the absorbance of merocyanine. The change in absorbance with respect to time is monitored and evaluated the first order kinetic constant (FIG. 1; a, b, c). The kinetic data for the spiropyran derivative 1-4 in four different polymers is provided in Table 2.

Formula:

Calculate the rate constant $$kt = \ln(A_0 - A_a / A_t - A_a)$$

$A_0$=Initial absorption @ λmax nm (Merocyanine)
$A_a$=Final absorption @ λmax nm (Spiropyran)
$A_t$=absorption at a given time Half life time $$t_{1/2} = 0.693/kt$$

Kinetic data of other spiropyran and polymer matrix is also calculated this way table is given below;

TABLE 2

The kinetic data for the spiropyran derivative 1-4 in four different polymers

| Polymer/ concentration (% wt) | | SP-1 Rate constant (s$^{-1}$) at rt $k_{MC \to SP}$ | $t_{1/2}$ (s) | SP-10 Rate constant (s$^{-1}$) at rt $k_{MC \to SP}$ | $t_{1/2}$ (s) | SP-CH$_2$CH$_2$OH Rate constant (s$^{-1}$) at rt $k_{MC \to SP}$ | $t_{1/2}$ (s) | SP-CO$_2$H$^a$ Rate constant (s$^{-1}$) at rt $k_{MC \to SP}$ | $t_{1/2}$ (s) |
|---|---|---|---|---|---|---|---|---|---|
| PEO | 8 mg | 3.5 × 10$^{-3}$ | 199 | 3.7 × 10$^{-3}$ | 186 | 8.8 × 10$^{-4}$ | 788 | 2.6 × 10$^{-2}$ | 27 |
| PDMS | 8 mg | 6.4 × 10$^{-3}$ | 108 | 1.1 × 10$^{-2}$ | 61 | 5.9 × 10$^{-4}$ | 117 | — | — |
| EPDM | 8 mg | 9.5 × 10$^{-4}$ | 725 | 3.5 × 10$^{-3}$ | 198 | 1.4 × 10$^{-3}$ | 502 | — | — |
| PS | 8 mg | 2.1 × 10$^{-3}$ | 332 | 2.9 × 10$^{-3}$ | 237 | 4.2 × 10$^{-3}$ | 167 | — | — |

$^a$Due to solubility of this spiropyran probe, the experiments in PDMS, EPDM, and PS is not carried out.

Example 6: Spiropyran in PDMS Polymer

Change in red, green, and blue component upon irradiation is monitored for the SP dye in PDMS film. Systematic kinetic studies in polymers such as PEO, PDMS, EPDM and PS showed polarity dependent effects, in which non-polar polymer showed relatively faster kinetics than the polar polymers. It is interesting to that merocyanine from compound 4 exhibits 100 times higher half-life period in PS than PEO. These remarkable changes in the kinetics may be utilized to make a SP based security tags. In an example, spiropyran embedded PDMS film was exposed to UV light and red, green, blue components of the observed merocyanine color were monitored at each stage of irradiation and at different times. Temperature effect on the ring closing reaction (merocyanine to spiropyran) was also studied and as summarized in Table 3.

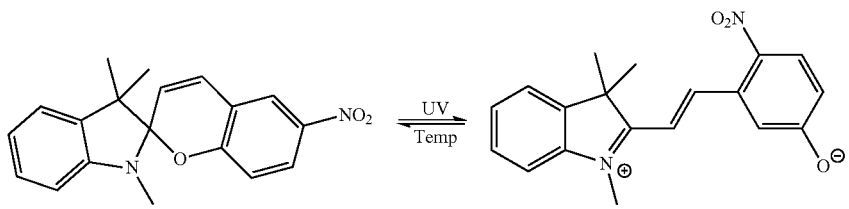 [SMILES: CN1c2ccccc2C(C)(C)C12C=Cc1cc([N+](=O)[O-])ccc1O2 ; "UV" ; C[N+]1=C(/C=C/c2cc([O-])ccc2[N+](=O)[O-])C(C)(C)c2ccccc21]

TABLE 3

Temperature effect of Merocyanine to Spiropyran (SP-1) in PDMS film

| Temperature | Time (S) |
|---|---|
| 40° C. | 39 |
| 50° C. | 34 |
| 60° C. | 17 |
| 70° C. | 11 |
| 80° C. | 9 |

Example 7: Embedding SP-10 in to Polypropylene Fiber

Polymer fibres containing spiropyran derivatives could be a suitable platform to realize photochromic features as security threads in currency notes. Hence, inventors also made an attempt to embed photochromic molecules into polymers and make stimuli-responsive fibres. A very small amount of spiropyran derivatives was melt compounded into polypropylene, a thermoplastic fibre forming polymer, using a DSM twin screw micro compounder and successfully extruded into fibres of 25-30 micron diameter. The spiropyran derivatives were found to be thermally stable under polymer melt-processing conditions and retained their photochromic function. Interestingly, the time of exposure for inducing color change is considerably reduced when the geometry is changed from films to fibres, owing to higher specific surface area of fibres. Upon exposing the pressed polypropylene film containing SP-10, showed the immediate color change to blue, and the kinetics on the reverse reaction is studied. The kinetic study showed the half life period of 372 s for the merocynine form. The systematic studies showed that the half life of merocyanine that was formed by photo-irradiation of SP derivative could be modulated by proper choice of polymer and the functional groups at the SP. SP embedded polypropylene fiber was formed and studied the photochromic activity of the fiber.

ADVANTAGES OF INVENTION a. Novel compounds which can be used for security tags.
b. Novel compounds with lesser reversal time

The invention claimed is:

1. A composition comprising 1,3,3-trimethyl-6-nitrospiro (chromene-2,2'-indolinine) and 1-decyl-3',3'-trimethyl-6-nitrospiro[chromene-2,2'-indoline] embedded in polydimethylsiloxane.

2. The composition according to claim 1, wherein said composition is configured to be used as a security tag.

* * * * *